US009448361B2

(12) United States Patent
Lee et al.

(10) Patent No.: US 9,448,361 B2
(45) Date of Patent: Sep. 20, 2016

(54) PHOTOELECTRIC WIRING MODULE

(71) Applicant: LS MTRON LTD., Anyang-si (KR)

(72) Inventors: Seung-hun Lee, Seoul (KR); In-duck Song, Seongnam-si (KR); Keon-cheol Park, Gyeonggi-do (KR); Ick-kyun Lee, Gunpo-si (KR)

(73) Assignee: LS MTRON LTD., Anyang-Si, Gyeonggi-Do (KR)

( * ) Notice: Subject to any disclaimer, the term of this patent is extended or adjusted under 35 U.S.C. 154(b) by 201 days.

(21) Appl. No.: 14/360,307

(22) PCT Filed: Nov. 29, 2012

(86) PCT No.: PCT/KR2012/010226
§ 371 (c)(1),
(2) Date: May 23, 2014

(87) PCT Pub. No.: WO2013/081390
PCT Pub. Date: Jun. 6, 2013

(65) Prior Publication Data
US 2014/0326861 A1    Nov. 6, 2014

(30) Foreign Application Priority Data

Nov. 29, 2011    (KR) .................. 10-2011-0126145

(51) Int. Cl.
*G02B 6/36*    (2006.01)
*G02B 6/12*    (2006.01)
(Continued)

(52) U.S. Cl.
CPC ............... *G02B 6/12* (2013.01); *G02B 6/426* (2013.01); *G02B 6/4242* (2013.01); *G02B 6/4245* (2013.01); *G02B 6/4257* (2013.01); *G02B 6/4286* (2013.01); *G02B 6/43* (2013.01)

(58) Field of Classification Search
CPC .................................................. G02B 6/4201
USPC ....................................................... 385/88, 92
See application file for complete search history.

(56) References Cited

U.S. PATENT DOCUMENTS

| 6,467,972 | B2 | 10/2002 | Setoguchi |
| 7,284,916 | B2* | 10/2007 | Sasser .................. G02B 6/4204 385/92 |
| 7,488,122 | B2* | 2/2009 | Hashimoto .......... G02B 6/4277 385/49 |
| 7,711,237 | B2 | 5/2010 | Hamasaki et al. |

(Continued)

FOREIGN PATENT DOCUMENTS

| CN | 101379662 A | 3/2009 |
| JP | 2001-318283 A | 11/2001 |

(Continued)

OTHER PUBLICATIONS

SIPO Office Action for Chinese Patent Application No. 201280058044.9 which corresponds to the above-identified U.S. application.

*Primary Examiner* — Thanh Luu
(74) *Attorney, Agent, or Firm* — LRK Patent Law Firm

(57) ABSTRACT

Disclosed is a photoelectric wiring module which includes: a substrate; a frame mounted on the substrate; an optical device package configured to perform photoelectric conversion or electro-optic conversion of a signal; an optical control device configured to control an operation of the optical device package; and an optical transmission line configured to transmit an optical signal that is emitted from the optical device package or incident on the optical device package. Electrical terminals are disposed on the frame, the optical device package is mounted on the frame, and the optical control device is disposed within the frame and mounted on the substrate.

19 Claims, 14 Drawing Sheets

(51) Int. Cl.
    *G02B 6/42*    (2006.01)
    *G02B 6/43*    (2006.01)

(56) References Cited

U.S. PATENT DOCUMENTS

2006/0013542 A1\* 1/2006 Schunk ................ G02B 6/4201
                                                385/92
2009/0202244 A1   8/2009 Jin et al.

FOREIGN PATENT DOCUMENTS

| JP | 2007-148107 A   | 6/2007  |
| JP | 2009-103758 A   | 5/2009  |
| JP | 2010-266729 A   | 11/2010 |
| KR | 10-0258962 B1   | 3/2000  |
| KR | 10-0300979 B1   | 6/2001  |
| KR | 10-2005-0123311 A | 12/2005 |
| KR | 10-0810665 B1   | 2/2008  |
| KR | 10-2010-0055719 A | 5/2010  |

\* cited by examiner

PHOTOELECTRIC WIRING MODULE

CROSS REFERENCE TO PRIOR APPLICATIONS

This application is a National Stage Application of PCT International Patent Application No. PCT/KR2012/010226 filed on Nov. 29, 2012, under 35 U.S.C. §371, which claims priority to Korean Patent Application No. 10-2011-0126145 filed on Nov. 29, 2011, which are all hereby incorporated by reference in their entirety.

TECHNICAL FIELD

The present invention relates to a photoelectric wiring module, and more particularly, to a photoelectric wiring module for transmitting a massive amount of data between boards in apparatuses at a high speed. In particular, the present invention relates to a photoelectric wiring module that is based on an optical device package (e.g., a vertical-cavity surface-emitting laser package (VCSEL PKG) and a photodiode PKG (PD PKG)) having a vertical alignment structure for butt-coupling and passive-alignment.

BACKGROUND ART

Thanks to the development of IT technology, high performance, acceleration, high integration, and miniaturization (thinning) of recent electronic apparatuses (e.g., smartphones, smart televisions (TVs), computers, tablet PCs, displays, digital cameras, camcorders, MP3 players, game consoles, navigation, etc.) are progressing. Recent trends in electronic apparatuses require a technique of transmitting large amounts of data, such as high-resolution or 3-dimensional (3D) image contents, between boards in apparatuses. Thus, signal attenuation, noise, electromagnetic interference (EMI)/electromagnetic compatibility (EMC), impedance matching, crosstalk, skew, connection wiring miniaturization, etc. have been highlighted as big issues.

In general, copper (Cu)-based wirings, i.e., electrical connectors, have been used to transmit data in apparatuses. However, the copper-based wirings neither meet the needs of high-speed transmission of large amounts of data nor solve various technical issues in accordance with the above-described latest trends in electronic apparatuses. As a technique for solving the technical issues, an optical wiring technique has recently been studied and developed. In other words, optical wirings enable high-speed transmission of big amounts of data by replacing parallel electrical signal lines of dozens of channels with serial optical signal lines, and may solve technical problems, such as noise, EMI/EMC, impedance matching, crosstalk, skew, and connection wiring miniaturization.

FIG. 1 is a perspective view of an embodiment of a conventional optical cable module used to connect boards in an apparatus. The optical cable module illustrated in FIG. 1 is disclosed in Japanese Patent Registration No. 4631671 (entitled "Optical cable module and electronic apparatus having the optical cable module") [hereinafter referred to as 'Conventional art 1'] that will be described below.

The optical cable module of FIG. 1 includes a transmitter 10a and a receiver 10b. The transmitter includes a VCSEL chip 3a, an electrode pad 5a, a bonding wire 7a, a liquid resin 8a, and a height support member 4a disposed on a substrate 6a. The receiver includes a photodiode (PD) chip 3b, an electrode pad 5b, a bonding wire 7b, a liquid resin 8b, and a height support member 4b disposed on a substrate 6b.

A connection wiring between the transmitter and the receiver includes an optical waveguide 2.

On analysis of operations of the optical cable module of FIG. 1, an electric signal (i.e., image data) of a mainboard connected to the transmitter is converted into an optical signal by the VCSEL chip 3a under the control of a driver integrated circuit (driver IC) (not shown) via the electrode pad 5a disposed on the substrate 6a. The optical signal is vertically emitted from the VCSEL chip 3a in an upward direction, reflected by a 45° mirror surface of an end tip of the optical waveguide 2, and transmitted to the receiver via the optical waveguide 2.

In the receiver, the optical signal is vertically reflected in a downward direction via the 45° mirror surface of the end tip of the optical waveguide 2 and incident on the PD chip 3b disposed on the substrate 6b. The optical signal is converted into an electric signal by the PD chip 3b under the control of a transimpedance amplifier (TIA) (not shown) via the electrode pad 5b disposed on the substrate 6b, and input to a display board connected to the receiver.

FIG. 2 is a perspective view of an embodiment of a conventional photoelectric conversion module used to connect chips in an apparatus. The photoelectric conversion module illustrated in FIG. 2 is disclosed in Korean Patent Registration No. 810665 (entitled "photoelectric conversion module and method for manufacturing the same") [hereinafter referred to as 'Conventional art 2'] that will be described below.

The photoelectric conversion module illustrated in FIG. 2 includes a transmitter 200 and a receiver 300 disposed on a printed circuit board (PCB) 500 and includes an optical waveguide 400 as a connection wiring between the transmitter and the receiver. The transmitter 200 includes an IC substrate 200a, electrode pads 211 and 212 formed on a top surface of the IC substrate 200a, an electrode pad 220 formed on a side surface of the IC substrate 200a, a driver IC 230 bonded to the top surface of the IC substrate 200a via the electrode pads 211 and 212, and a VCSEL chip 251 bonded to the side surface of the IC substrate 200a via the electrode pad 220.

The receiver 300 includes an IC substrate 300a, electrode pads 311 and 312 formed on a top surface of the IC substrate 300a, an electrode pad 320 formed on a side surface of the IC substrate 300a, a TIA 330 bonded to the top surface of the IC substrate 300a via the electrode pads 311 and 312, and a PD chip 350 bonded to the side surface of the IC substrate 300a via the electrode pad 320.

FIG. 3 is a perspective view of an embodiment of a conventional optoelectronic hybrid connector used to connect boards in an apparatus. The optoelectronic hybrid connector illustrated in FIG. 3 is disclosed in Japanese Patent Publication No. 2010-266729 (entitled "optoelectronic hybrid connector") [hereinafter referred to as 'Conventional art 3'] that will be described below.

The optoelectronic hybrid connector of FIG. 3 includes a plug 20 mated with an electrical connector 30 (which is called a receptacle) mounted on a board in an apparatus. The plug 20 includes a housing 21, an electrical terminal 22 and a ground terminal 23 mounted on both side surfaces of the housing 21, a ground plate 24 mounted on an inner bottom surface of the housing 21, a VCSEL chip 26 disposed on a sub-mount 25 mounted on the ground plate 24, a driver IC 27, a bonding wire 28 configured to function as a wiring for connection of the electrical terminal 22 and the ground terminal 23 with the VCSEL chip 26 and the driver IC 27, and an optical fiber 29 inserted into the housing 21.

DISCLOSURE

Technical Problem

However, since Conventional art 1 has a vertical alignment structure using the 45° mirror surface between the VCSEL chip and the optical waveguide and uses the height support member, optical loss, an optical coupling distance, and small height are disadvantageous, and thus Conventional art 1 cannot be miniaturized.

Also, since Conventional art 1 uses a sealing liquid resin to protect the VCSEL chip, the optical waveguide is affected by expansion of the liquid resin, and thus optical focusing is not properly performed.

In addition, Conventional art 1 requires a 45° processing process in a manufacturing process. Also, since alignment between the VCSEL chip and the optical waveguide should be finely tuned by hand, mass production rates are markedly lowered.

Meanwhile, in Conventional art 2, the VCSEL chip is mounted on a side surface of the IC substrate using an electrode pad and solder balls and the fixing of the VCSEL chip cannot be ensured, and thus physical mounting of the VCSEL chip is unstable.

Also, in Conventional art 2, since the optical waveguide is mounted on the surface of the VCSEL chip using an adhesive, physical fixing of the optical waveguide cannot be ensured. Thus, optical focusing is not properly performed.

Furthermore, in Conventional art 2, the VCSEL chip is located and mounted on the side surface of the IC substrate using a pickup apparatus in a manufacturing process. However, process reliability cannot be ensured, thereby remarkably lowering mass productivity.

Meanwhile, Conventional art 3 uses the ground plate 24. Since the ground plate 24 is formed of a metal unlike a PCB, a wiring for connecting and mounting devices cannot be formed. That is, in Conventional art 3, the driver IC 27 disposed on the ground plate 24 should be electrically connected to the electrical terminal 22 disposed on the side surface of the housing 21 using a wire bonding process. However, it is difficult to embody the bonding wire 28 on the plug 20 having a small size and a low height. In particular, when the number of pins of the electrical terminal 22 is increased, performing the wire bonding process is practically impossible.

In addition, in Conventional art 3, all devices and components should be mounted within the housing 21 of the plug 20 having a small size and the bonding wire 28 should be used. Also, since it is difficult to form the electrical terminal 22 and the ground terminal 23, process difficulty is high, and productivity is markedly lowered.

Also, in Conventional art 3, while the VCSEL chip 26 is placed on the sub-mount 25 manufactured using a wafer and mounted on the ground plate 24, the optical fiber 29 is placed on the ground plate 24 and optically aligned with the VCSEL chip 26. The optical fiber 29 cannot be fixed onto a portion of the VCSEL chip 26 so that optical focusing cannot be properly performed.

Furthermore, since Conventional art 3 is structured such that the electrical terminal 22 is formed only on an outer sidewall of the housing 21 to ensure a device mounting space in the housing 21 of the plug 20, a double contact structure cannot be provided during the mating of the plug 20 with the receptacle 30 [i.e., a single contact structure is provided]. Thus, reliability of electrical connection of the plug 20 with the receptacle 30 cannot be ensured.

Also, in Conventional art 3, when the plug 20 is mated with (inserted into) the receptacle 30 or detached (pulled out) from the receptacle 30, since the plug does not include any portion that may be grasped by a hand, it is difficult to manipulate the plug 20.

Thus, the present invention has been proposed to solve the above-described problems and meet the above-described demands, and provides a photoelectric wiring module, which ensures low costs, miniaturization (height/area), mass productivity (ease of manufacturing and process simplification), and enables high-speed transmission of large amounts of data between boards in an apparatus to ensure optical coupling reliability and physical stability for mounting components.

That is, the present invention provides a commercially applicable photoelectric wiring module, which has a highly reliable manufacturing process and is generally applicable to boards in an apparatus. In particular, the present invention is directed to providing a photoelectric wiring module that is based on an optical device package (e.g., a VCSEL PKG and a PD PKG) having a horizontal alignment structure for butt-coupling and passive alignment.

The technical objectives of the present invention are not limited to the above disclosure; other objectives and advantages may become apparent to those of ordinary skill in the art based on the following descriptions of exemplary embodiments of the invention. Also, it would be easily understood that the objectives and advantages of the present invention may be realized by the claims and combinations thereof.

Technical Solution

One aspect of the present invention provides a photoelectric wiring module including: a substrate; a frame mounted on the substrate; an optical device package configured to perform photoelectric conversion or electro-optic conversion of a signal; an optical control device configured to control an operation of the optical device package; and an optical transmission line configured to transmit an optical signal that is emitted from the optical device package or incident on the optical device package. Electrical terminals are disposed on the frame, the optical device package is mounted on the frame, and the optical control device is disposed within the frame and mounted on the substrate.

Advantageous Effects

According to the present invention as described above, devices and components of a photoelectric wiring module can be used without any modification such as an additional processing process, the photoelectric wiring module can be easily produced in large quantities, and a process of mounting the devices and components on a substrate is facilitated to ensure mass productivity, such as manufacturing speed, etc. Furthermore, a process of processing a mirror surface of an optical transmission line need not be performed.

In addition, the present invention provides a horizontal alignment structure between an optical device package and the optical transmission line. Thus, the optical device package and the optical transmission line can be butt-coupled at a close distance with each other without an additional member, such as a lens, a mirror, or the like. During the coupling of the optical device package with the optical transmission line, passive alignment may be performed instead of an active alignment process of adjusting a position while taking measurements using a measuring apparatus. Also, optical coupling reliability and physical stability for mounting components can be ensured.

Also, since the photoelectric wiring module according to the present invention has the horizontal alignment structure instead of a vertical alignment structure, an optical coupling distance can be minimized to promote reliability of optical alignment.

In addition, the photoelectric wiring module according to the present invention is structured such that a frame functioning as an electrical connector is mounted on the substrate and an electrical component and an optical component are disposed within the frame. Thus, miniaturization and low height can be promoted.

Also, the present invention can be easily applied to an inner board of an applied product and ensure performance and reliability, thereby enabling commercialization of the photoelectric wiring module.

In addition, since the present invention provides a double contact structure during the mating of the plug with the receptacle, electrical connection reliability of the photoelectric wiring module can be ensured.

Furthermore, since the present invention does not use a bonding wire, a plurality of narrow-pitch electrical terminal pins can be formed on the plug. Thus, a plug-type photoelectric wiring module can be embodied regardless of the number of the pins.

MODE FOR INVENTION

The objects, features, and advantages of the present invention will be apparent from the following detailed description of embodiments of the invention with references to the following drawings, so that the disclosure can be easily implemented by one skilled in the art. Descriptions of well-known components and processing techniques are omitted so as not to unnecessarily obscure the embodiments of the present invention. The present invention will now be described more fully with reference to the accompanying drawings, in which exemplary embodiments of the invention are shown.

Figure 1:
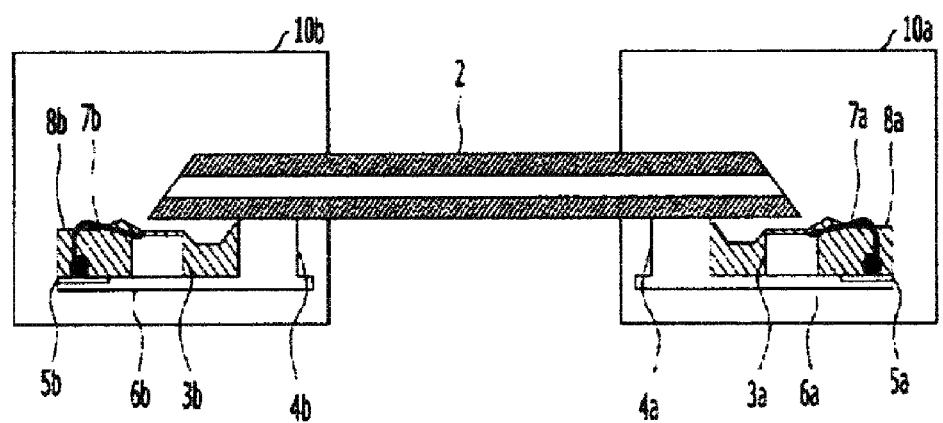
FIG. 1 is a perspective view of an embodiment of a conventional optical cable module used to connect boards in an apparatus.
Figure 2:
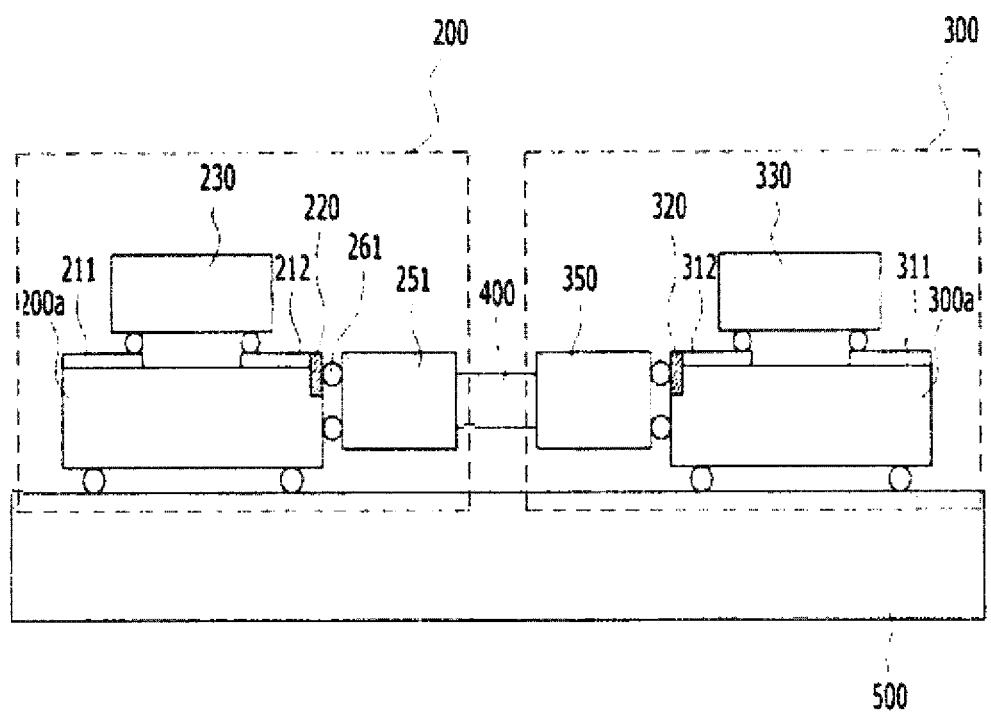
FIG. 2 is a perspective view of an embodiment of a conventional photoelectric conversion module used to connect chips in an apparatus.
Figure 3:
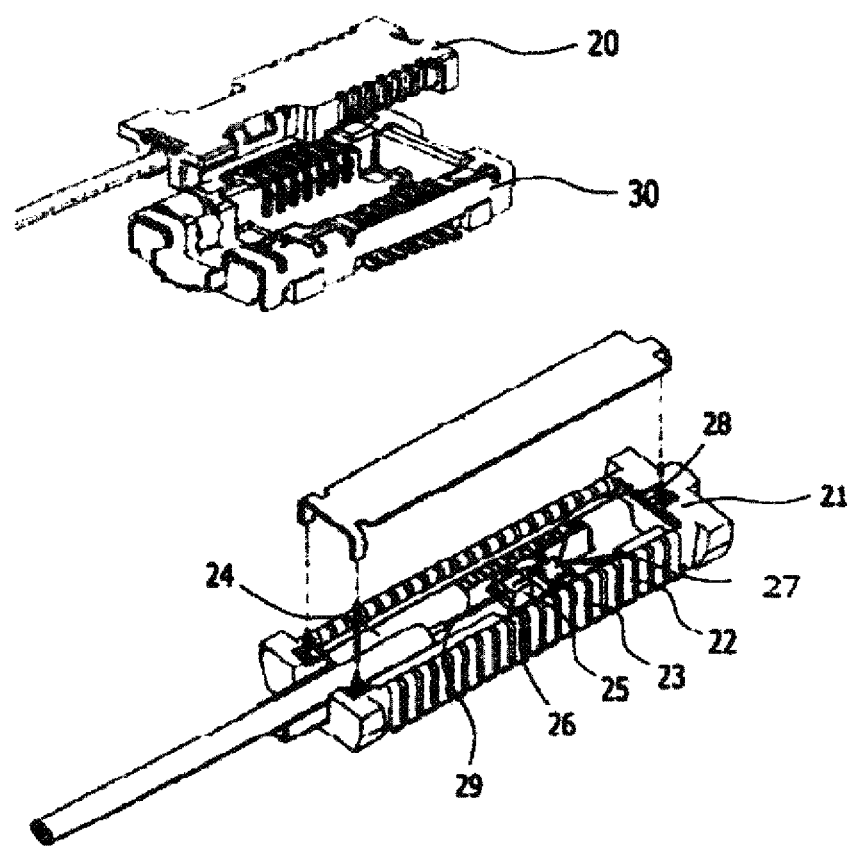
FIG. 3 is a perspective view of an embodiment of a conventional optoelectronic hybrid connector used to connect boards in an apparatus.
Figure 4:
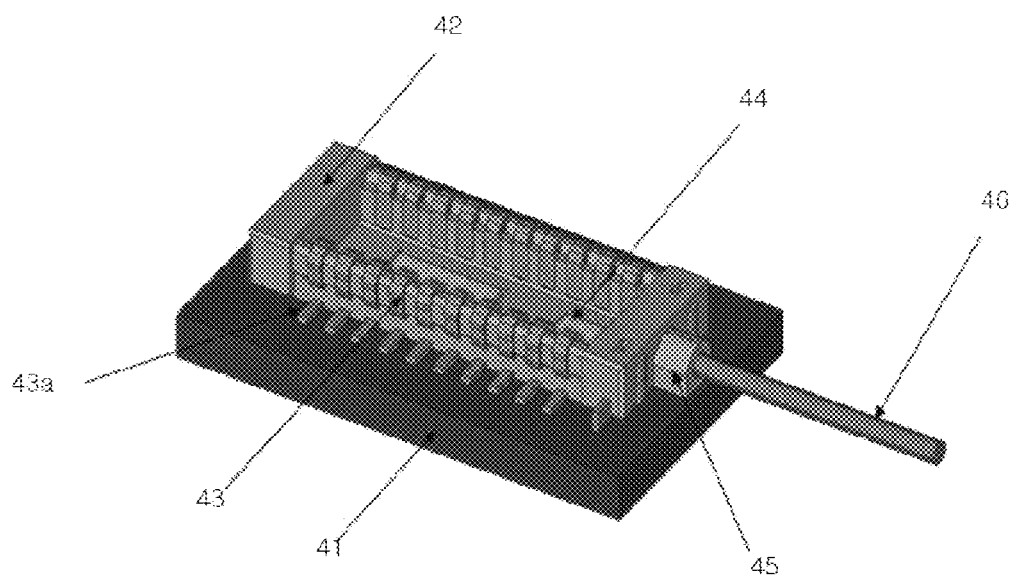
FIG. 4 is a perspective view of a photoelectric wiring module according to an exemplary embodiment of the present invention.
Figure 5:
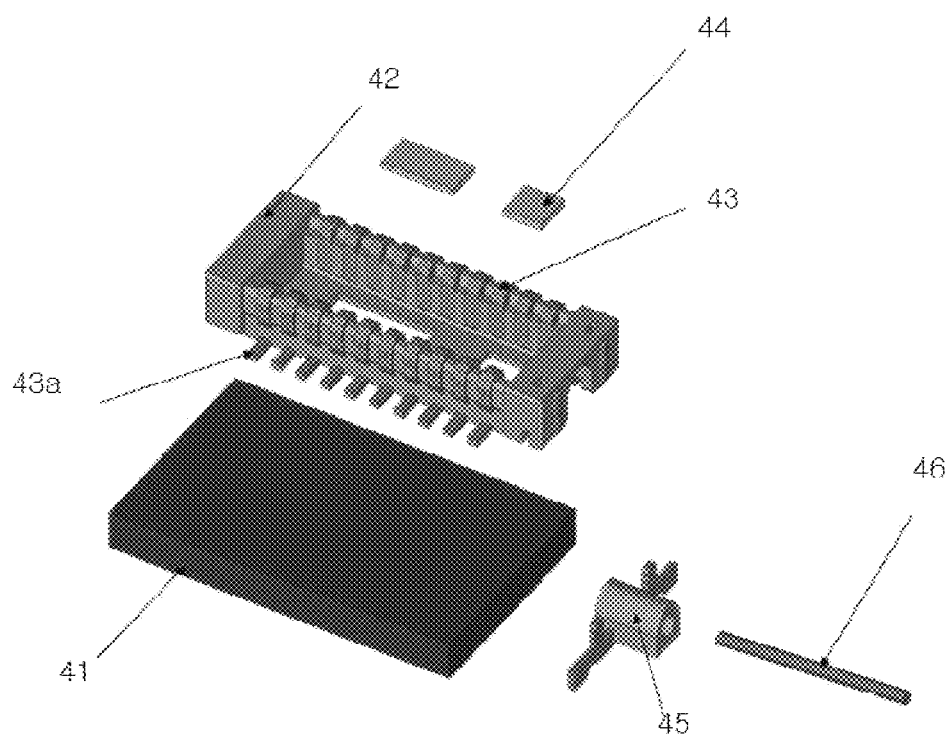
FIG. 5 is an exploded view of the photoelectric wiring module of FIG. 4.
Figure 6A:
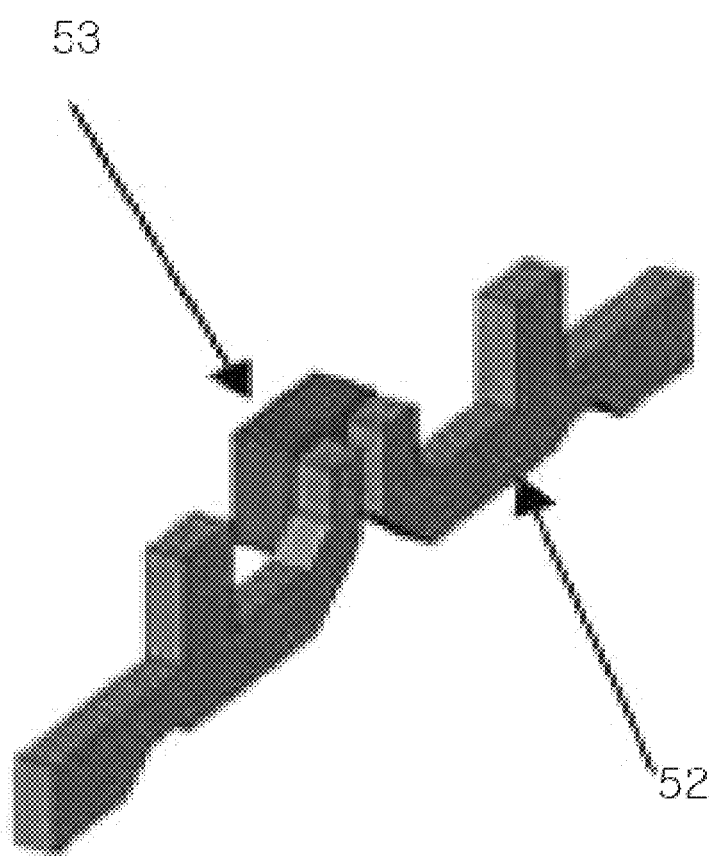
FIG. 6 is perspective views of an optical device package proposed in the present invention.
Figure 6B:
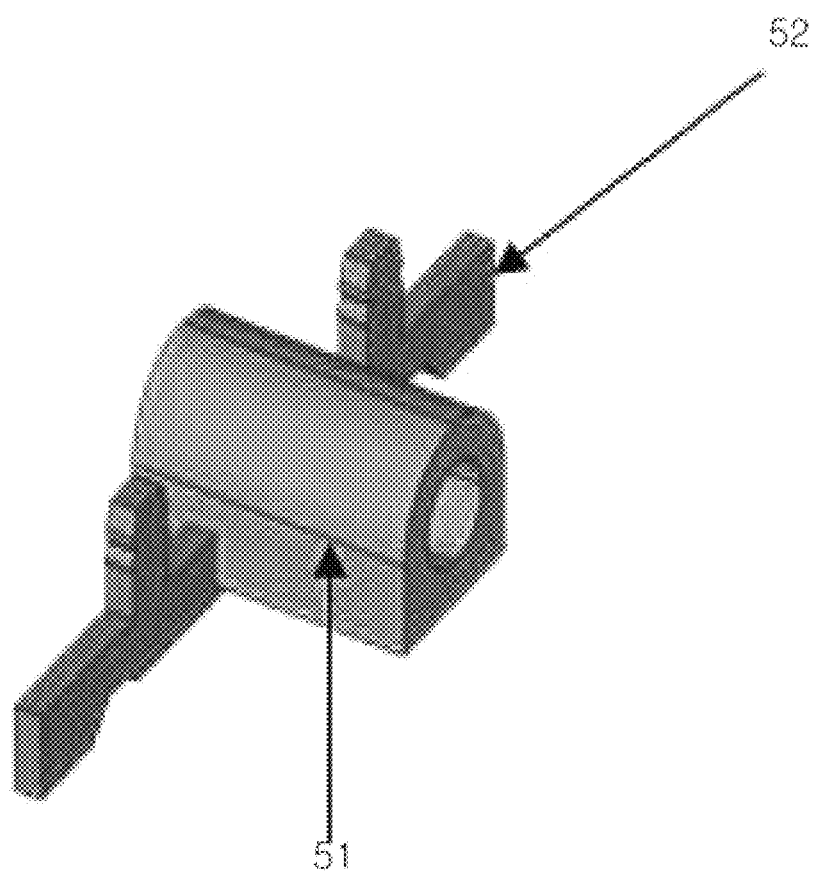
Figure 6C:
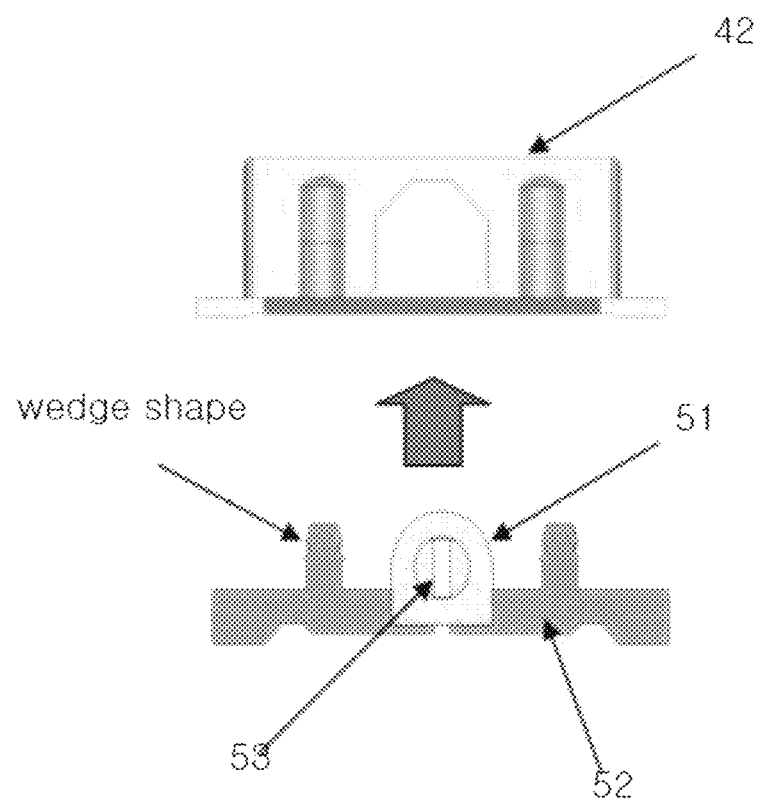
Figure 6D:
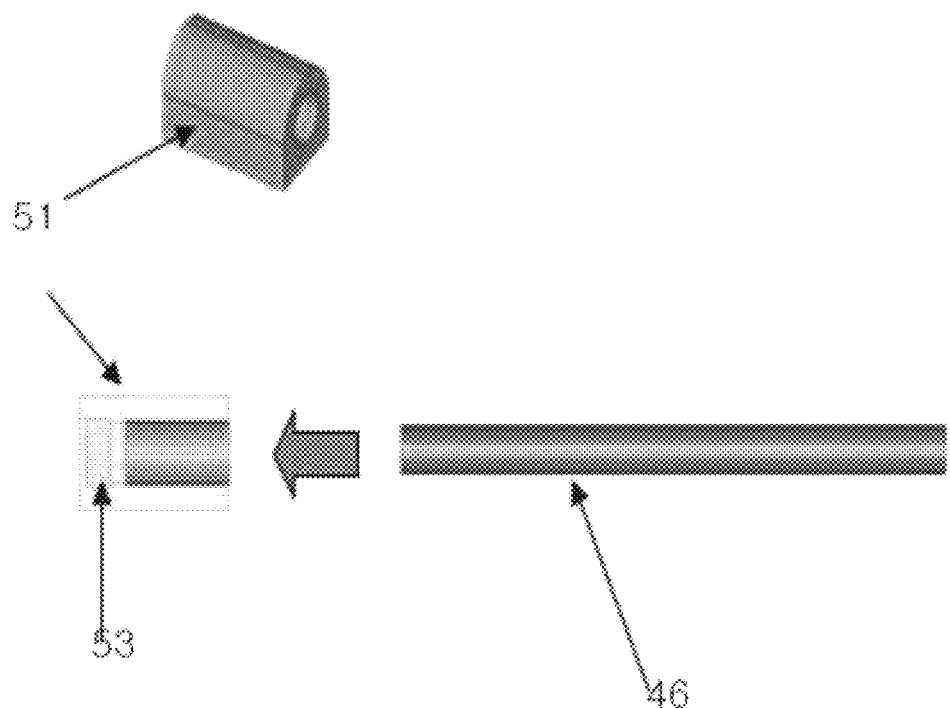
Figure 7A:
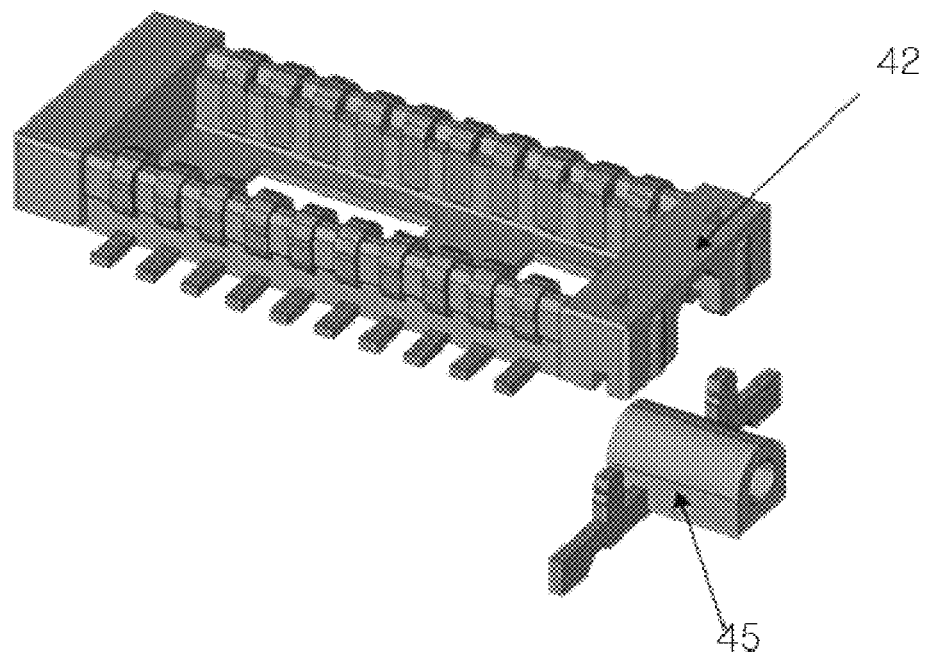
FIG. 7 is assembly diagrams of a process of manufacturing a photoelectric wiring module according to the present invention.
Figure 7B:
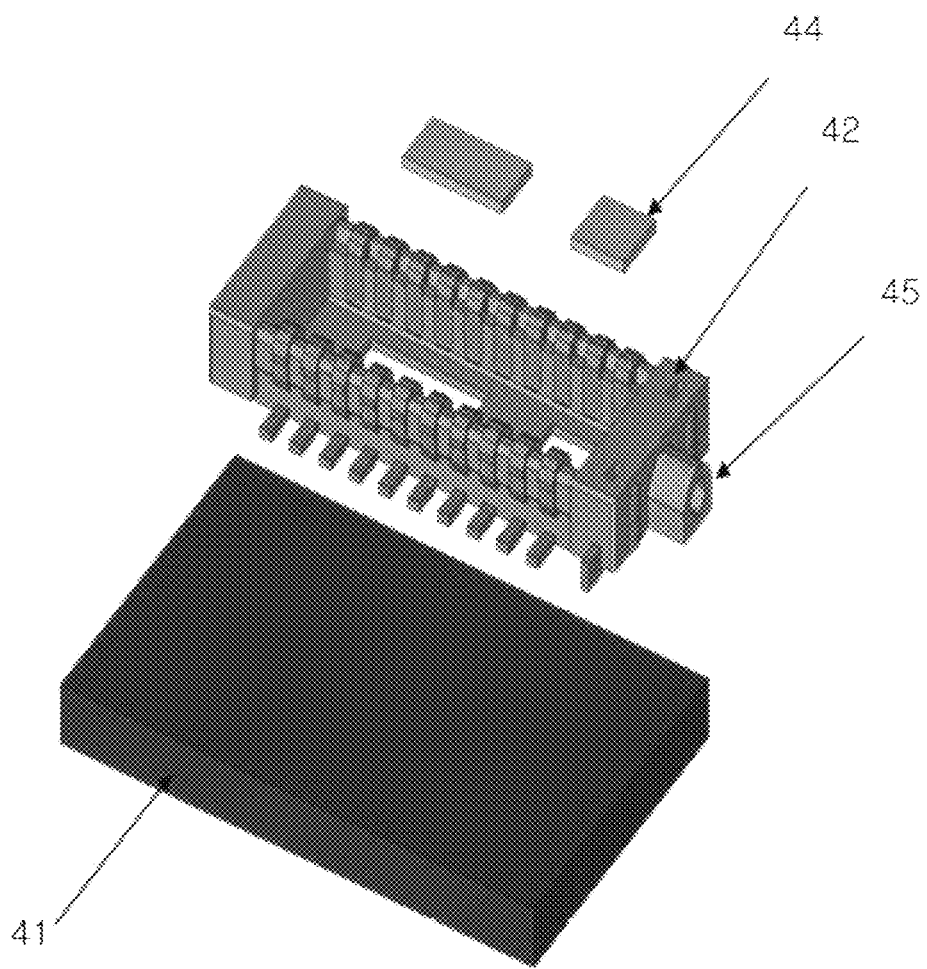
Figure 7C:
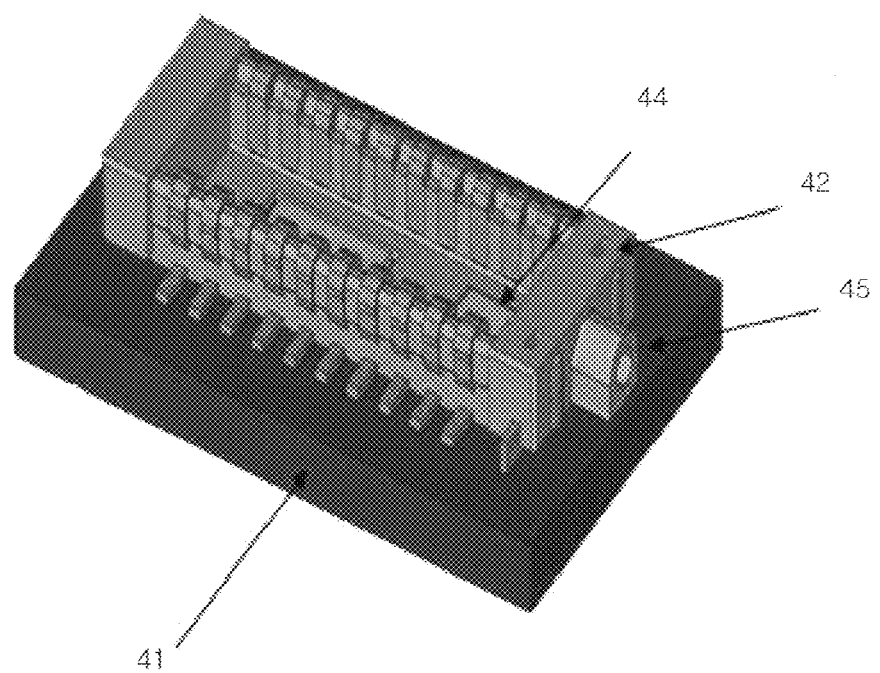
Figure 7D:
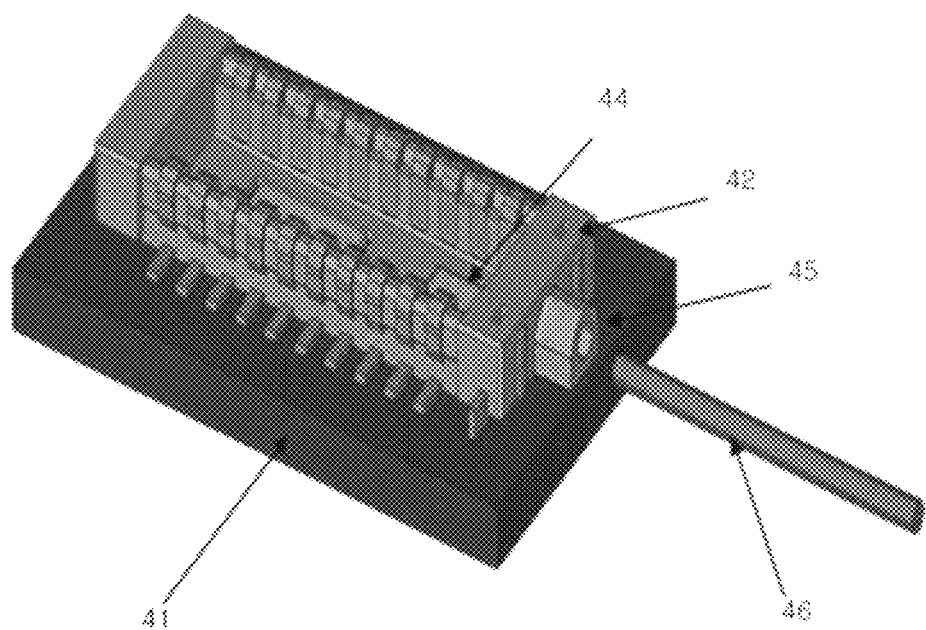

FIG. 4 is a perspective view of a photoelectric wiring module according to an exemplary embodiment of the present invention, FIG. 5 is an exploded view of the photoelectric wiring module of FIG. 4, FIG. 6 is perspective views of an optical device package proposed in the present invention, and FIG. 7 is assembly diagrams of a process of manufacturing a photoelectric wiring module according to the present invention.

As shown, the photoelectric wiring module according to the present invention includes a substrate 41 on which a wiring and an electrode pad [not shown] for mounting and coupling devices (components) are formed, a frame 42 mated with a receptacle [not shown] disposed on a board and on which an electrical terminal 43 having an electrical connection function is mounted, an optical control device 44 configured to control an operation of an optical device package 45, the optical device package 45 configured to perform photoelectric conversion or electro-optic conversion of a signal, and an optical transmission line 46 configured to transmit an optical signal emitted from the optical device package 45 or incident on the optical device package 45.

In the photoelectric wiring module of the present invention, the optical device package 45 is mounted on the frame 42, and the frame 42 and the optical device package 45 are placed on the substrate 41. The optical control device 44 is placed and mounted on the substrate 41 through a groove formed in a bottom surface of the frame 42 so that the optical transmission line 46 can be inserted and mounted in the optical device package 45. That is, in the photoelectric wiring module according to the present invention, electrical components [the electrical terminal 43 and the optical control device 44] and an optical component [the optical device package 45] are mounted on the substrate 41, and the electrical components are disposed in the frame 42 functioning as an electrical connector. In other words, the present invention has 'a structure in which a device is disposed in a plug disposed on a substrate.' In addition, the optical control device 44 is mounted not on the frame 42 but on the substrate 41. To this end, a groove through which the optical control device 44 may pass is formed in a bottom surface of the frame 42.

As mentioned above, in the photoelectric wiring module according to the present invention, the electrical terminal 43 is mated with the receptacle disposed on the board and used to transmit data between boards in an apparatus. That is, the frame 42 and the electrical terminal 43 according to the present invention function as known electrical connectors [plugs] and are not limited to the shown shapes and structures. In other words, the electrical terminal 43 and the frame 42 of the photoelectric wiring module of the present invention may be understood as having various board-to-board (B2B) connector shapes and structures.

Electrical terminals 43, which are electrically mated with the receptacle, are mounted on an inner wall and an outer wall of both side surfaces of the frame 42, and electrical leads 43a are connected to the electrical terminals 43 disposed on the side surfaces of the frame 42, and formed on a bottom surface of the frame 42. The frame 42 may include a plastic injection material and be formed using a known electrical connector process.

In particular, the frame 42 of the present invention provides a double contact structure during the mating of the frame 42 with the receptacle because the electrical terminals 43 are formed on the inner wall and outer wall of both of the side surfaces of the frame 42. Thus, reliability of the electrical connection of the photoelectric wiring module may be ensured, and de-mating of the plug from the receptacle may be prevented. Since a bonding wire need not be used in the frame 42, an inner space may be ensured. Thus, the electrical terminals 43 may be formed to have a double contact structure.

The substrate 41 includes a wiring and an electrode pad for mounting various devices. That is, the electrical terminals 43 of the frame 42, the electrical leads 43a, the optical control device 44, and the optical device package 45 are electrically connected by the wiring of the substrate 41. In the present invention, the substrate 41 may be formed of a base material having insulating characteristics, such as a single-side printed circuit board (PCB), a dual-side PCB, a multilayered PCB, a flexible PCB (FPC), an integrated circuit (IC) substrate, an interposer, etc. The substrate 41 is preferably a multilayered PCB by which a high-density, small-sized circuit may be easily embodied.

In the present invention, devices are easily connected and mounted using a PCB as a substrate instead of a metal-based ground plate used in Conventional art 3. Since a bonding wire is not used, even if the number of narrow-pitch pins of the electrical terminals 43 is increased, the photoelectric wiring module may be embodied. That is, in the present invention, the electrical leads 43a of the frame 42, the optical control device 44, and the optical device package 45 are mounted on the substrate 41 and electrically connected using a reflow process instead of a wire bonding process used in Conventional art 3. Thus, the photoelectric wiring module may be embodied using a plug-type electrical connector having a small size and a low height, and mass productivity may be promoted.

In addition, the substrate 41 of the present invention functions as a plug handle. That is, when the electrical terminals 43 of the frame 42 of the photoelectric wiring module are mated with (inserted into) the receptacle 30 or detached (pulled out) from the receptacle 30, the substrate 41 may be grasped by hand and easily manipulated. Furthermore, the substrate 41 functions as a cover (lid) of the photoelectric wiring module and serves to externally shield the optical control device 44 and the optical device package 45.

Meanwhile, as described in Background Art, the photoelectric wiring module according to the present invention includes a transmitter and a receiver. For example, in a photoelectric wiring module configured to transmit large amounts of data at a high speed between boards in an apparatus, the transmitter is mounted on a mainboard on which a central processing unit (CPU) is mounted, the receiver is mounted on a display board, and an optical transmission line is formed between the transmitter and the receiver.

The transmitter and the receiver of the photoelectric wiring module of the present invention have the same shape and structure as shown. However, a light emitting control device and a light emitting device package (e.g., VCSEL package) are provided at the transmitter, and a light receiving control device and a light receiving device package (e.g., a photodiode (PD) package) are provided at the receiver.

The optical control device 44 controls an operation of the optical device package 45 that performs photoelectric conversion (e.g., in a PD) or electro-optic conversion (e.g., in a VCSEL) of a signal. The light emitting control device is mounted as an optical control device at the transmitter of the photoelectric wiring module, and the light receiving control device is mounted as an optical control device at the receiver. That is, the light emitting control device processes an electric signal received through a first electrical terminal, and drives and controls the light emitting device package so that the electric signal can be converted into an optical signal. The light emitting control device may include components, such as a serializer/deserializer (SerDes) chip, a driver IC, a resistor, etc.

The light receiving control device drives and controls the light receiving device package and processes an optical signal received from the optical transmission line so that the optical signal can be converted into an electric signal. The light receiving control device may include components, such as a transimpedance amplifier (TIA), an amplifier, a SerDes chip, etc. The optical transmission line 46 may be embodied by an optical waveguide, an optical fiber (e.g., polymer optical fiber (POF)), etc., and need only include a core and a clad as an optical transmission medium.

Next, the optical device package 45 will be described in detail with reference to FIG. 6. As illustrated in FIG. 6, the optical device package 45 according to the present invention includes a housing 51 having an external opening and an inner cavity, leads 52 mounted on the housing 51, and an optical device chip 53 mounted on the leads 52. The optical device package of the present invention may also be defined as a 'single-view optical device package,' and is embodied by packaging the housing, the leads, and the optical device chip.

The optical device chip 53 is mounted across two F-shaped leads 52. The optical device chip 53 is a component having a surface from which light is emitted or on which light is incident. For example, the optical device chip 53 may be a light emitting device chip, such as a VCSEL, or a light receiving device chip, such as a PD. That is, the optical device chip 53, which is a VCSEL, converts an electric signal received from the optical control device 44 through the leads 52 into an optical signal and emits the optical signal toward the surface of the optical device chip 53, i.e., toward the opening of the housing 51. Light emitted by the VCSEL is incident on the optical transmission line 46 according to the mounting of the optical transmission line 46 in the opening of the housing 51 as will be described later.

The leads 52 on which the optical device chip 53 is mounted are inserted and mounted in the inner cavity of the housing 51 from a bottom surface of the housing 51. The leads 52 are mounted in the housing such that the optical device chip 53 is located in the center of the cavity of the housing and a direction of an emission surface or incidence surface of the optical device chip 53 faces the opening of the housing 51.

Also, bottom surfaces of the leads 52 protrude from the housing 51. In the optical device package 45, an upper cross-section of the housing 51 and upper cross-sections of the leads 52 are inserted and mounted in a groove portion formed in a side surface of a lengthwise end of the frame 42. To fixedly mount the optical device package 45 in the groove portion of the frame 42, one end portions of the leads 52 of the optical device package 45 preferably have wedge shapes. When the optical device package 45 is mounted on the frame 42 as described above, the bottom surface of the housing 51 of the optical device package 45 is fixedly mounted to be in contact with the top of the substrate 41, and the bottom surfaces of the leads 52 of the optical device package 45 are mounted to be in contact with the top of an electrode pad disposed on the substrate 41.

The leads 52 are placed and mounted on the electrode pad of the substrate 41 and connect the substrate 41 with the optical device chip 53, i.e., function as an electric signal wiring. The leads 52 may be embodied by a metal conductor.

The optical transmission line 46 is inserted and mounted in the inner cavity through the opening of the housing 51. Here, a fixing stopper configured to stop insertion of the optical transmission line 46 is prepared at an end tip of the inner cavity of the housing 51. That is, the fixing stopper is formed at a portion of the end tip of the inner cavity of the housing 51 at which an end tip (preferably, a core of the end tip) of the optical transmission line 46 is inserted in a location close to the emission surface or the incidence surface of the optical device chip 53.

In the present invention, the housing 51 may be manufactured using a plastic injection material. After the plastic injection material is manufactured, the plastic injection material may be packaged using a process of mounting the optical device chip 53 on the leads 52 by bonding or a process of mounting the plastic injection material, the leads 52, and the optical device chip 53 by insertion molding.

Optical coupling of the optical device package 45 with the optical transmission line 46 according to the present invention will now be described in detail. While the leads 52 of the optical device package 45 are placed and mounted on the electrode pad of the substrate 41, the core of the optical transmission line 46 is inserted into the stopper through the opening of the housing of the optical device package 45. In this case, due to the stopper of the housing of the optical device package 45, the end tip of the core of the optical transmission line 46 is mounted in a location (e.g., a distance of several tens of μm or less) close to the emission surface (or incidence surface) of the optical device chip 53 in the optical device package 45.

Also, a transparent epoxy is filled around and/or inside the opening of the optical device package 45 and around the end tip of the optical transmission line 46. The transparent epoxy compensates for optical coupling between the core of the optical transmission line 46 and the emission surface (or incidence surface) of the optical device chip, and prevents shaking of the core of the optical transmission line 46 so that the core of the optical transmission line 46 can be fixedly attached. Here, the transparent epoxy has about the same refractive index as the optical transmission line 46, and a polymer-based epoxy having a high light transmittance is preferably used. As an example, a transparent epoxy having a refractive index of 1.2 to 1.8 and having a light transmittance of about 80% to 95% in the wavelength range of the optical transmission line 46 may be used.

In addition, the core of the end tip of the optical transmission line 46 is spaced a predetermined distance apart from the emission surface or incidence surface of the optical device chip 53 in the inner cavity of the housing 51. A shape with a structure serving as a lens may be formed or a lens may be further mounted within the housing 51 to enable optical focusing, i.e., so that light of the optical device chip 53 can be precisely emitted to the core of the optical transmission line 46.

Since the optical transmission line 46 is inserted into the housing 51 of the optical device package 45 as described above, shaking of the optical transmission line 46 may be avoided to ensure physical fixing of the optical transmission line 46. Thus, optical alignment reliability may be ensured.

The optical device package of FIG. 6 was devised in the present invention for the following reason. The optical device package 45 of FIG. 6 is mounted on the substrate 41, so that the emission surface or the incidence surface of the optical device chip 53 is disposed on the same axis parallel to the optical transmission line 46 on the substrate 41. That is, the optical device package of FIG. 6 has a horizontal structure in which an emission direction (or incidence direction) of the optical device chip 53, a lengthwise direction of the substrate 41, and a lengthwise direction of the optical transmission line 46 are the same.

In general, a vertical cavity surface emitting laser (VCSEL) is obtained by turning an end of a distributed Bragg reflector (DBR) laser, and light is emitted not from a surface other than a side surface of the VCSEL, unlike a typical laser diode (LD). That is, a die of a VCSEL chip is mounted on a top surface of a substrate of a photoelectric wiring module to emit light in an upward direction of the substrate, and a line should be vertically changed at an angle of 90° using a 45° mirror surface to enable optical coupling with an optical transmission line. In other words, the VCSEL chip cannot be mounted on the substrate so as to emit light toward the optical transmission line placed on the substrate. Thus, it can be confirmed that many problems occur when the VCSEL chip is mounted on the top surface of the substrate or the side surface of the substrate as described in Background Art.

Meanwhile, a known light emitting diode (LED) package is also structured such that leads are formed on a surface [i.e., a die portion of a chip] opposite to a light emission surface, and light cannot be emitted toward an optical transmission line placed on a substrate. That is, even if the LED package structure is applied to a photoelectric wiring module, optical coupling cannot be ensured.

Thus, in the present invention, the optical device package of FIG. 6 has been proposed so that the VCSEL chip and the optical transmission line are disposed on the same parallel axis on the substrate to enable optical coupling [this will be defined as a 'horizontal alignment structure' in the present invention]. Thus, butt-coupling and passive alignment may be achieved.

Naturally, since a VCSEL and a PD have the same structure, in the present invention, the PD may also be used to form an optical device package as shown in FIG. 6. That is, the light emitting device package and the light receiving device package have the same structure as the above-described optical device package 45. Here, the light emitting device chip of the light emitting device package may be embodied by a VCSEL or LED having a predetermined wavelength range and a performance of several to several tens of Gbps, and is preferably a VCSEL. The light receiving device chip of the light receiving device package may be embodied by a PD.

Next, a process of assembling a photoelectric wiring module will be described with reference to FIG. 7. A frame 42 on which electrical terminals 43 and electrical leads 43a are mounted is manufactured using a plastic injection material and a metal material, and a housing 51, leads 52, and an optical device chip 53 are packaged to manufacture an optical device package 45. Also, the optical device package 45 is mounted on the frame 42.

Also, while the frame 42 on which the optical device package 45 is mounted and the optical control device 44 are disposed on the substrate 41, a device mounting process is performed. That is, the electrical leads 43a of the frame 42 and the leads 52 of the optical device package 45 are placed and mounted on the corresponding electrode pad disposed on the substrate 41.

In the present invention, the frame 42 and an optical control device 44 may be mounted on the substrate 41 by discretely or simultaneously performing any one process among flip-chip bonding (FCB), surface mount technology (SMT), reflow, and wire bonding or a selective combination process on the substrate 41. Preferably, after the frame 42 and the optical control device 44 are placed on the substrate 41, one reflow process may be performed. In this case, the frame 42 and the housing 51 may include a heat resistant plastic injection material in consideration of a reflow temperature. Also, while the frame 42 and the optical control device 44 are mounted on the substrate 41, the optical transmission line 46 is fixedly inserted into the optical device package 45.

The photoelectric wiring module having the optical coupling structure between the optical device package and the optical transmission line according to the present invention as described above have the following merits. Devices and components of the optical wiring module including the optical device package and the like may be used without any modification such as an additional processing process. The optical wiring module may be easily produced in large quantities, and it is easy to perform a process of mounting the devices and the components on a substrate, thereby ensuring mass productivity, such as a manufacturing rate. Furthermore, a process of processing a mirror surface of the optical transmission line is not needed. As a horizontal alignment structure between the optical device package and the optical transmission line, the optical device package and the optical transmission line may be butt-coupled with each other at a close distance without an additional member, such as a lens or a mirror. During the coupling of the optical device package with the optical transmission line, passive alignment may be performed instead of an active alignment process of adjusting a position while taking measurements using a measuring apparatus. Also, optical coupling reliability and physical stability for mounting components can be ensured.

Since the photoelectric wiring module according to the present invention has not a vertical alignment structure but the horizontal alignment structure, an optical coupling distance may be minimized to derive optical alignment reliability. Since a frame functioning as an electrical connector is mounted on the substrate and an electrical component and an optical component are disposed within the frame, miniaturization and small height can be promoted. The photoelectric wiring module may be easily applied to an inner board of an applied product, and performance and reliability may be ensured, so that commercialization of the photoelectric wiring module may be promoted.

Figure 8:
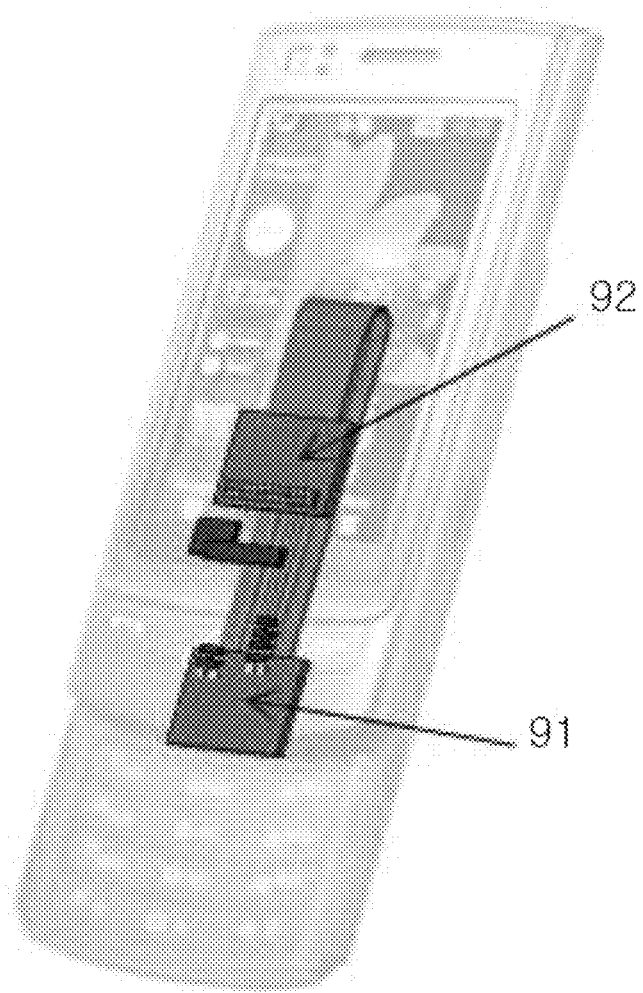
FIG. 8 is a diagram for explaining an apparatus to which a photoelectric wiring module according to the present invention is applied.

Next, an example in which a photoelectric wiring module of the present invention is mounted in an apparatus and used to transmit data between boards in the apparatus will be described with reference to FIG. 8. FIG. 8 is a diagram for explaining an apparatus to which a photoelectric wiring module of the present invention is applied. As illustrated in FIG. 8, in the present invention, the photoelectric wiring module is mounted on a board so that the photoelectric wiring module can be used to transmit a large amount of data at a high speed between boards in the apparatus.

The photoelectric wiring module of the apparatus will now be described by giving an example in which image data is transmitted between a CPU and a display in a smartphone. In the photoelectric wiring module of the apparatus, a transmitter 91 is mounted on (detached from) a mainboard to enable electrical connection, and an electric signal transmitted from the mainboard is input to a light-emitting control device of the transmitter 91. Meanwhile, a receiver 92 is mounted on (detached from) a display board to enable electrical connection, and an electric signal received from a light receiving control device of the receiver 92 is input to a display board.

Although a unidirectional-data-transmission photoelectric wiring module has been described as an example in the previous embodiments of the present invention, a bi-directional-data-transmission photoelectric wiring module may be embodied by forming a transceiver on a first substrate and forming a transceiver on a second substrate. Also, a plurality of transceivers, that is, optical package arrays, may be formed on each of a first substrate and a second substrate so that a multi-channel bi-directional-data-transmission photoelectric wiring module can be embodied. Although an optical device package formed by packaging an optical device chip in an injection housing was provided in one embodiment of the present invention, an optical device (e.g., a VCSEL or a PD) and an optical control device (e.g., a driver IC, a TIA or a SerDes) may be embodied along with an injection housing within a single package.

While the present invention has been described in connection with exemplary embodiments thereof, the scope of the invention is not limited to the detailed description of the invention hereinabove. It will be understood by those of ordinary skill in the art that it is capable of various changes and modifications without departing from the spirit and scope of the invention.

The invention claimed is:

1. A photoelectric wiring module comprising:
   a substrate;
   a frame mounted on the substrate;
   an optical device package configured to perform photoelectric conversion or electro-optic conversion of a signal;
   an optical control device configured to control an operation of the optical device package; and
   an optical transmission line configured to transmit an optical signal that is emitted from the optical device package or incident on the optical device package,
   wherein electrical terminals are formed on the frame, the optical device package is mounted on the frame, and the optical control device is disposed within the frame and mounted on the substrate, and
   wherein a groove is formed in an inner bottom surface of the frame, and the optical control device is mounted on an electrode pad of the substrate through the groove formed in the inner bottom surface of the frame.

2. The photoelectric wiring module of claim 1,
   wherein the optical device package is mounted in a groove formed on a bottom surface of one side of the frame, and an electrical lead formed on a bottom surface of the frame and a lead formed on a bottom surface of the optical device package are mounted on an electrode pad of the substrate.

3. The photoelectric wiring module of claim 1,
   wherein the electrical terminals of the frame are electrically connected to the optical control device and the optical device package through a wiring formed on the substrate.

4. The photoelectric wiring module of claim 1,
   wherein the electrical terminals are electrically mated with a receptacle and formed on an inner wall and an outer wall of both side surfaces of the frame.

5. The photoelectric wiring module of claim 1,
   wherein the optical device package comprises:
   a housing into which the optical transmission line is inserted;
   a lead mounted across the outside and inside of the housing; and
   an optical device chip mounted on a portion of the lead mounted inside the housing.

6. The photoelectric wiring module of claim 5,
   wherein the lead is inserted from a bottom surface of the housing into an inner cavity of the housing and mounted, and the optical device chip is mounted on a portion of the lead disposed in the center of the inner cavity of the housing.

7. The photoelectric wiring module of claim 5, wherein a portion of the lead mounted outside the housing protrudes from a bottom surface of the housing, and an upper cross-section of the housing and an upper cross-section of the lead are inserted into a groove formed in a bottom surface of one side of the frame and mounted so that the portion of the lead mounted outside the housing is mounted on the substrate.

8. The photoelectric wiring module of claim 7, wherein one end portion of the upper cross-section of the lead has a wedge shape to fixedly mount the upper cross-section of the lead in the groove formed in the bottom surface of the one side of the frame.

9. The photoelectric wiring module of claim 5, wherein the optical transmission line is inserted into an inner cavity of the housing through an opening of the housing, and a stopper configured to stop insertion of the optical transmission line is formed in a location close to an emission surface or incidence surface of the optical device chip in the inner cavity of the housing.

10. The photoelectric wiring module of claim 5, wherein, in the optical device package, an emission surface or incidence surface of the optical device chip is disposed on the same axis parallel to the optical transmission line on the substrate.

11. A photoelectric wiring module comprising:
a substrate;
a frame mounted on the substrate;
an optical device package configured to perform photoelectric conversion or electro-optic conversion of a signal;
an optical control device configured to control an operation of the optical device package; and
an optical transmission line configured to transmit an optical signal that is emitted from the optical device package or incident on the optical device package,
wherein electrical terminals are formed on the frame, the optical device package is mounted on the frame, and the optical control device is disposed within the frame and mounted on the substrate, and
wherein the electrical terminals are electrically mated with a receptacle and formed on an inner wall and an outer wall of both side surfaces of the frame.

12. The photoelectric wiring module of claim 11, wherein the optical device package is mounted in a groove formed on a bottom surface of one side of the frame, and an electrical lead formed on a bottom surface of the frame and a lead formed on a bottom surface of the optical device package are mounted on an electrode pad of the substrate.

13. The photoelectric wiring module of claim 11, wherein the electrical terminals of the frame are electrically connected to the optical control device and the optical device package through a wiring formed on the substrate.

14. The photoelectric wiring module of claim 11, wherein the optical device package comprises:
a housing into which the optical transmission line is inserted;
a lead mounted across the outside and inside of the housing; and
an optical device chip mounted on a portion of the lead mounted inside the housing.

15. The photoelectric wiring module of claim 14, wherein the lead is inserted from a bottom surface of the housing into an inner cavity of the housing and mounted, and the optical device chip is mounted on a portion of the lead disposed in the center of the inner cavity of the housing.

16. The photoelectric wiring module of claim 14, wherein a portion of the lead mounted outside the housing protrudes from a bottom surface of the housing, and an upper cross-section of the housing and an upper cross-section of the lead are inserted into a groove formed in a bottom surface of one side of the frame and mounted so that the portion of the lead mounted outside the housing is mounted on the substrate.

17. The photoelectric wiring module of claim 16, wherein one end portion of the upper cross-section of the lead has a wedge shape to fixedly mount the upper cross-section of the lead in the groove formed in the bottom surface of the one side of the frame.

18. The photoelectric wiring module of claim 14, wherein the optical transmission line is inserted into an inner cavity of the housing through an opening of the housing, and a stopper configured to stop insertion of the optical transmission line is formed in a location close to an emission surface or incidence surface of the optical device chip in the inner cavity of the housing.

19. The photoelectric wiring module of claim 14, wherein, in the optical device package, an emission surface or incidence surface of the optical device chip is disposed on the same axis parallel to the optical transmission line on the substrate.

* * * * *